United States Patent Office 3,576,785
Patented Apr. 27, 1971

3,576,785
ORGANOTIN STABILIZED RESIN COMPOSITIONS
Lewis B. Weisfeld, Highland Park, N.J., assignor to Carlisle Chemical Works, Inc., Reading, Ohio
No Drawing. Original application June 3, 1966, Ser. No. 554,965, now Patent No. 3,478,071, dated Nov. 11, 1969. Divided and this application Sept. 4, 1969, Ser. No. 876,150
Int. Cl. C08f 45/62
U.S. Cl. 260—45.75        8 Claims

ABSTRACT OF THE DISCLOSURE

Heat and light stable halogen-containing resin compositions are stabilized by the reaction product of an organotin mercaptoacid derivative selected from the group consisting of $R_n Sn(SR'COOR'')_{4-n}$, $[RSn(SR'COOR'')_2]_2$ X and

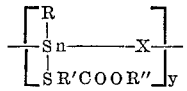

wherein R and R'' are alkyl radicals. R' is selected from the group consisting of an alkylene group of at least 2 methylene groups, X is a member of the group consisting of oxygen and sulfur, $n$ is an integer from 1 to 3 and $y$ designates the degree of polymerization, with an organotin compound selected from the group consisting of organotin oxides, monohydrocarbyltin oxides, and hydrocarbyl stannoic acids and esters.

---

This application is a division of our co-pending application, Ser. No. 554,965, filed June 3, 1966, for New Organotin Compositions, now U.S. Pat. No. 3,478,071.

This invention relates to new organotin compounds and to compositions containing the same.

As heat and light stabilizers for various resins, particularly vinyl chloride resins, organotin mercaptoacid esters have been used in recent years to an ever increasing extent. Such esters have the formula (1)        $R_n Sn(SR'COOR'')_{4-n}$ wherein R represents a monovalent organic group, generally an alkyl group, preferably an alkyl group having 4–12 C atoms, such as butyl, octyl, dodecyl and the like. However, it may be also an aryl, alkaryl, aralkyl, alkenyl, oxyalkyl, oxyaryl, cycloalkyl, or any other group which, when the compound is used as stabilizer, does not adversely affect the resin.

R' is an alkylene group, and R'' is the monovalent radical of an alcohol used to esterify the carboxyl group of the mercaptoacid. Generally, it will be an alkyl group having not more than about 20 and preferably 4–12 C atoms. $n$ is an integer in the range of 1–3. If $n$ is larger than 1, $R_n$ may contain different R groups.

Such organotin mercaptoesters containing the Sn—S linkage, though widely used, have still some drawbacks. One of said drawbacks is the well known objectionable smell presented by the stabilized resin during processing and also in the finished articles. Another disadvantage of the organotin mercaptoacid ester stabilizers is their relatively low tin content. In order to be most effective in rigid plastic formulations, they have to be employed in such large amounts as to lower the heat distortion temperature.

I have now found that at least one of the recited drawbacks and in many cases both can be eliminated by using, instead of the organotin mercapto acid esters, their reaction products with organotin oxides or with stannoic acids, or esters of stannoic acids. Although their precise structures are not always known and their degrees of hydration or polymerization may vary, these reactants may for convenience be represented by the formula (2)        $R^a R^b SnO$ and (3)        $R^a SnOOH$ or (4)        $R^a SnOOR^c$ wherein $R^a$ and $R^b$ have the same significance as R above. As used hereinafter in connection with these compounds the terms "mole" and "molar" shall be interpreted with relation to these formulae.

The reaction is preferably carried out in a suitable diluent such as toluene, benzene, or another inert organic solvent, at temperatures from room temperature to about 155° C. The reaction is mostly terminated in about 30–60 minutes. In order to strip the diluent, and water if formed, reduced pressure will be generally applied. The reaction products of the diorganotin mercaptoesters with diorganotin oxides can advantageously be obtained in a single step by reacting a mercaptoacid ester directly with the required amount of diorganotin oxide, whereby probably the first formed diorganotin dimercaptoester reacts further in situ with the excess organotin compound; however, also in this case, of course, a preformed organotin mercapto acid ester can be reacted with the organotin compound.

Most of the resultant reaction products are clear slightly viscous liquids. When fully reacted, they are completely compatible with e.g. polyvinyl chloride, in contrast, e.g., to the organotin oxides used as reactants. This shows that actual reaction has taken place between the organotin mercapto acid ester and the organotin oxide or sulfide.

In the following description, the term "organotin oxide" is used for the sake of brevity and is intended to refer equally also to stannoic acids and esters. The "organotin oxide" must be employed in such amounts that, after formation of the Sn–S linkage, an excess, preferably at least one mole, is still available. If the organotin mercapto ester contains several carboxylate groups, at least one such excess mole of the "organotin oxide" should be used but not more such excess moles than correspond to the number of available carboxylate groups.

If the excess of "organotin oxide" over the amount required for the Sn—S linkage is less than 1 mole, the reaction product will be a mixture of conventional organotin mercapto esters with compounds of the composition discussed hereinbelow. If the amount of "organotin oxide" is in excess of the available carboxylate groups, said excess will not react and, if used as stabilizer for resins, will form a component which is incompatible with the resin and interfere with the stabilizer action.

A diorganotin dimercaptoester can be reacted with one or two moles of "organotin oxide"; a monoorganotin triester reacts with 1, 2, or 3 moles of the "organotin oxide", while a triorganotin mercaptoester reacts with only one mole of the "organotin oxide." The assumption that the reaction takes place in the carboxyl group of the ester is strengthened by the observation that e.g. a dialkyl tin bis (thioglycolic acid ester) does not enter the reaction; it appears that some minimum spacing between the Sn—S and the carboxylate groups is necessary and thatt he spacing alkylene group of the mercapto acid must have at least a length of two carbon atoms.

Assuming said reaction mechanism, the obtained reaction products would be represented by the formula (5)        $R_n SnZ_{4-n}$ wherein R has the same significance as above, $n$ is an integer from 1 to 3, and Z has the formula (6) 

wherein R" has again the same meaning as above, A is phenylene, or an alkylene chain of at least two methylene groups, which may be interrupted by phenylene; and Q is one of the compounds (2) to (4). If the reaction product contains more than one Z group, such additional Z moieties need not contain the group Q. Also, in one or more of the said methylene groups, one or more hydrogen atoms may be replaced by harmless substituents including an ester group.

If, instead of the compounds of the Formula 1, compounds of the formula (7)             [RSn(SR'COOR")₂]₂X or (7a) 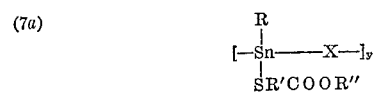

X being oxygen or sulfur, and $y$ designating the degree of polymerization, are taken as starting materials, the reaction products will be represented by the formula (5a)         (RSnZ₂)₂X or (RSn(X)Z)_y wherein R, Z, and X have the same meaning as defined above.

Compounds of the Formula 7 are obtained by reaction of two moles of the mercapto acid ester with 1 mole of an organostannoic acid, while those for Formula 7a require only one mole of the mercaptoacid ester. Otherwise, the reaction is carried out in the same way as set forth above.

Though the above given formulae are consistent with with all observations made with respect to the organotin mercapto ester-organotin oxide reaction products, it must be understood that the formulae are not to be considered a limitation of the scope of the invention which relates broadly to products obtained by the recited reaction of organotin mercapto esters with "organotin oxides," provided that the mercapto acid of the ester has at least two CH₂ or similar groups. Suitable mercapto acid components are e.g. beta mercaptopropionic acid, β to ω mercaptolauric acids, mercapto phenyl acetic acid, mercaptobenzoic acid, and similar acids.

Resins stabilized by the organotin mercapto acid ester-"organotin oxide" reaction products are all those resins for which the organotin mercapto esters have been used. Such resins are particularly vinyl halide polymers and their copolymers with other ethylenically unsaturated compounds such as vinyl acetate, vinylidene chloride, styrene, acrylic compounds and the like. As the new stabilizers contain a much higher tin content per unit of weight, they are particularly useful for the stabilization of rigid compounds. They may be used in amounts of 0.1 to 10.0, preferably 0.1 to 3.0, part of stabilizer per 100 parts of resin.

Instead of mixing the resin with the prepared organotin mercapto acid ester—"organotin oxide" reaction product, the organotin mercapto acid ester and the "organotin oxide," in the proportions defined hereinabove, can be admixed separately to the resin prior to processing because the reaction product will be formed under the processing conditions.

Like the organotin mercaptoacid esters, the new compounds can be used together with a great number of other stabilizers to produce a desired effect.

The following examples are given to show the preparation of the new compounds and their use as stabilizers.

EXAMPLE 1

220 g. (1.0 mole) of isooctylmercaptopropionate and 248.7 g. (1.0 mole) of dibutyltin oxide in 250 ml. of toluene were heated first for 30 minutes at 120° C. and 90 mm. Hg and then for additional 30 minutes at 155° C. and 15 mm. Hg. After cooling and filtering, a clear light liquid was obtained containing 24.98% of tin. This corresponds to a compound of the formula

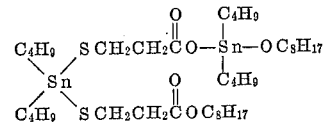

The theoretical Sn content of the compound is 25.9%.

If in the reaction the isooctyl mercapto propionate was replaced by the equimolar amount of isooctylmercaptoacetate, a dark liquid was obtained which was not stable and on standing precipitated much solid material. A successful reaction could not even be obtained when operating under a nitrogen atmosphere. There was always a great amount of unreacted dibutyltin oxide even after prolonged reaction times.

EXAMPLE 2

Example 1 was repeated but with 440 g. (2.0 moles) of isooctylmercaptopropionate and 746.1 g. (3.0 moles) of dibutyltin oxide. The reaction product was a clear light yellow liquid analyzing for 30.89% Sn.

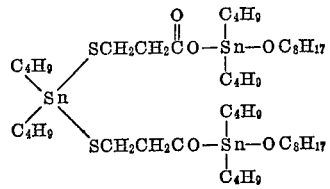

EXAMPLE 3

162 g. (1.0 mole) of butyl mercaptopropionate were heated as described in Example 1 with 248.7 g. (1.0 mole) of dibutyltin oxide in 250 ml. of toluene for 30 minutes first at a temperature of 120° C. at a pressure of 90 mm. Hg and then for 30 minutes at 155° C. at a pressure of 15 mm. Hg.

There were obtained 390 g. of a clear colorless liquid with 28.36% Sn (29.6% Sn theory) of a compound to which I attribute the following configuration:

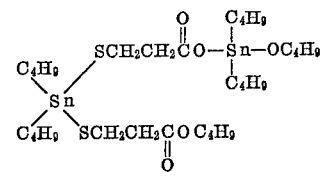

EXAMPLE 4

325 g. (2.0 moles) of butyl mercaptopropionate were treated with 746.1 g. (3.0 moles) of dibutyltin oxide as described in the preceding example. The obtained product was a clear slightly yellow liquid analyzing for 32.35% Sn, satisfying the formula

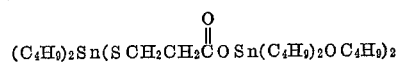

EXAMPLE 5

While the preceding examples illustrate the one-step procedure, this example shows first the preparation of a mercapto ester and in a second step its reaction with an "organotin oxide".

208.7 g' (1.0 mole) of butylstannoic acid and 250 ml. of toluene were charged into a three-neck flask and dehydrated via azeotropic distillation at 120° C. under atmospheric pressure.

654 g. (3.0 moles) of isooctyl betamercaptopropionate were added to the thus obtained product, and the mixture was stripped as set forth in the preceding examples at a temperature of 120° C. and a pressure of 90 mm. Hg. The filtered reaction product of the composition

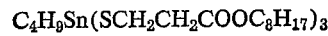

was a clearly slightly yellow liquid and had a tin content of 13.38% (theory 14.35%).

To 214 g. (0.258 mole) of this compound, there were added 180.57 g. (0.725 mole) of dibutyltin oxide and 100 ml. of toluene. The reaction mixture was stripped at a pressure of 15 mm. and a temperature at 120° C. The filtered end product was a viscous straw colored clear liquid containing 28.41% Sn.

The compound

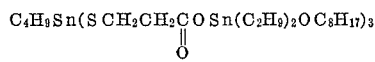

has a theoretical Sn content of 30.0%.

EXAMPLE 6

Example 5 was repeated with 436.8 g. (2 moles) of isooctyl betamercaptopropionate, instead of the 3 moles of Example 5. In this way, bis (monobutyltin diisooctyl mercaptopropionate) oxide of the formula

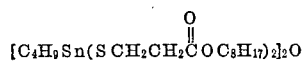

was obtained.

To 1240 g. (1.0 mole) of said compound, 994.8 g. (4.0 moles) of dibutyltin oxide and 500 ml. of toluene were added; the mixture was heated up to 120° C. and stripped at a pressure of 15 mm. Hg.

There were obtained 2150 g. of a clear straw colored liquid which analyzed for 30.8% Sn, corresponding to a compound

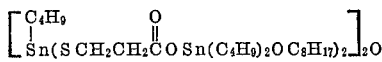

EXAMPLE 7

Example 5 was repeated but instead of 3 moles of the ester, only 218.4 g. (1 mole) of the isooctyl beta mercaptopropionate were used. The product was a very viscous straw colored clear liquid represented by the formula

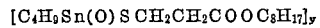

Sn found: 28.5%; theory 29.01%.

To 409.2 g. of said compound (1 mole), 248.9 g. (1 mole of dibutyltin oxide were added, and the mixture was reacted in the same manner as in the preceding examples.

EXAMPLE 8

The compounds of Examples 1 and 2 were compared with dibutyltin bis (isooctylacetomercaptide) with respect to heat stabilizing efficacy for vinylchloride resins on a part per part and on a percent tin per percent tin basis. The formulation consisted of 100 phr. of PVC homopolymer and 0.25 phr. of mineral oil. 2.00 phr. of each of the three organotin compounds were milled into this master batch for 3 minutes at 320° F., then strips of stock were oven aged at 350° F., removing samples every ten minutes. In addition, 1.50 phr. of the organotin compound of Example 1 and 1.15 phr. of the organotin compound of Example 2 were milled into virgin stock and these samples were treated analogously. The time to darkening of stock was noted, and also the ability to maintain good early color.

TABLE I

| Stabilizer | Parts per 100 parts of resin | Time to darkening |
| --- | --- | --- |
| Dibutyltin bis(isooctylacetomercaptide) | 2.00 | 90′ |
| From Example 1 | 2.00 | 110′ |
| From Example 2 | 2.00 | >120′ |
| From Example 1 | 1.50 | 100′ |
| From Example 2 | 1.15 | 100′ |

In all cases, also better early color was maintained with the products of Examples 1 and 2.

I claim:

1. A heat and light stable resin composition including as a major constituent, a halogen containing resin selected from the group consisting of vinyl halide homopolymers and copolymers of vinyl halides with other ethylenically unsaturated monomers and as a stabilizer 0.1 to 10 weight percent, calculated on said resin, of the reaction product of an organotin mercaptoacid derivative selected from the group consisting of

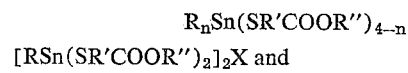

[RSn(SR'COOR")$_2$]$_2$X and

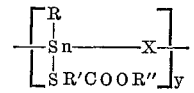

wherein R is an alkyl radical having up to 12 carbons, R" is an alkyl radical, R' is an alkylene group of at least 2-methylene groups, X is a member of the group consisting of oxygen and sulfur, $n$ is an integer from 1 to 3 and $y$ designates the degree of polymerization, with a diorganotin compound selected from the group consisting of organotin oxides, monohydrocarbyltin oxides, and hydrocarbyl stannoic acids and esters the molar ratio of the organotin mercaptoacid derivative to the organotin compound being in the proportion about 1:1 to 1:3.

2. The heat and light stable resin composition defined in claim 1 wherein the major constituent is polymerized vinyl chloride.

3. The heat and light stable resin composition defined in claim 2 wherein R' is an alkylene group of at least two methylene groups, which may be interrupted by a phenylene group, or may be a phenylene group, or in which one or more of the methylene groups may be substituted by other harmless functional groups in place of the hydrogens.

4. The heat and light stable resin composition defined in claim 2 wherein the organotin compound is a dialkyl tin oxide.

5. The heat and light stable resin composition defined in claim 2 wherein the organotin compound is dibutyl tin oxide.

6. The heat and light stable resin composition defined in claim 1 wherein said reaction product is formed in situ.

7. A heat and light stable resin composition including as a major constituent a halogen containing resin selected from the group consisting of vinyl halide homopolymers and copolymers of vinyl halide with other ethylenically unsaturated monomers and as a stabilizer 0.1 to 10 weight percent of the reaction product of one mole of a mercaptoacid ester corresponding to the formula HSR'COOR" wherein R" is an alkyl group and R' is an alkylene having at least 2 methylene groups, with a dialkyltin oxide in an amount exceeding half a mole but not exceeding 1½ moles and said alkyl groups bonded to the tin have up to 12 carbon atoms.

8. The heat and light stable resin composition defined in claim 7 wherein said major constituent is polymerized vinyl chloride.

References Cited

UNITED STATES PATENTS 3,478,071  11/1969  Weisfeld _____ 260—45.75
3,485,794  12/1969  Gloskey _____ 260—45.75

DONALD E. CZAJA, Primary Examiner

V. P. HOKE, Assistant Examiner

UNITED STATES PATENT OFFICE
CERTIFICATE OF CORRECTION

Patent No. 3,576,785                Dated April 27, 1971

Inventor(s) Lewis B. Weisfeld

It is certified that error appears in the above-identified patent and that said Letters Patent are hereby corrected as shown below:

Column 6, line 23, "with a dior-" should read -- with an or- --; line 25, "organotin oxides" should read -- diorganotin oxides --.

Signed and sealed this 23rd day of May 1972.

(SEAL)
Attest:

EDWARD M. FLETCHER, JR.          ROBERT GOTTSCHALK
Attesting Officer                Commissioner of Patents